(12) United States Patent
Koo et al.

(10) Patent No.: US 8,726,038 B2
(45) Date of Patent: May 13, 2014

(54) FPGA APPARATUS AND METHOD FOR PROTECTING BITSTREAM

(75) Inventors: Bon-Seok Koo, Daejeon (KR);
Jeong-Seok Lim, Daejeon (KR);
Jae-Woo Han, Daejeon (KR);
Kwang-Mo Yang, Daejeon (KR);
Soo-Hyeon Kim, Daejeon (KR);
Hyo-Won Kim, Daejeon (KR);
Jung-Hyung Park, Daejeon (KR);
Choon-Soo Kim, Daejeon (KR);
E-Joong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 52 days.

(21) Appl. No.: 13/454,143

(22) Filed: Apr. 24, 2012

(65) Prior Publication Data
US 2013/0159725 A1    Jun. 20, 2013

(30) Foreign Application Priority Data

Dec. 14, 2011   (KR) .................. 10-2011-0134839

(51) Int. Cl.
*G06F 11/30* (2006.01)
*G06F 12/14* (2006.01)

(52) U.S. Cl.
USPC ............................................. 713/189; 726/2

(58) Field of Classification Search
USPC ........................................................ 713/189
See application file for complete search history.

(56) References Cited

U.S. PATENT DOCUMENTS

| | | | | |
|---|---|---|---|---|
| 6,172,520 B1 * | 1/2001 | Lawman et al. | ........... | 326/38 |
| 6,772,230 B2 * | 8/2004 | Chen et al. | ........... | 710/8 |
| 7,952,387 B1 * | 5/2011 | Frazer | ........... | 326/38 |
| 8,209,545 B1 * | 6/2012 | Langhammer et al. | ....... | 713/189 |
| 8,242,805 B1 * | 8/2012 | Trimberger | ........... | 326/38 |
| 8,355,502 B1 * | 1/2013 | Donlin et al. | ........... | 380/37 |
| 8,363,833 B1 * | 1/2013 | Streicher et al. | ........... | 380/44 |
| 2001/0015919 A1 * | 8/2001 | Kean | ........... | 365/200 |
| 2007/0288765 A1 | 12/2007 | Kean | | |
| 2008/0028186 A1 * | 1/2008 | Casselman | ........... | 712/37 |

FOREIGN PATENT DOCUMENTS

| | | |
|---|---|---|
| EP | 1947798 A2 | 7/2008 |
| JP | 2003-303095 A | 10/2003 |
| KR | 10-2008-0093635 A | 10/2008 |
| KR | 10-2009-0080115 A | 7/2009 |
| WO | 01/46810 A1 | 6/2001 |
| WO | 2008/127408 A2 | 10/2008 |

OTHER PUBLICATIONS

Steve Trimberger; Trusted Design in FPGAs; Year: 2007; IEEE; 1-4.*

\* cited by examiner

*Primary Examiner* — Mohammad W Reza
*Assistant Examiner* — Monjour Rahim
(74) *Attorney, Agent, or Firm* — LRK Patent Law Firm

(57) ABSTRACT

An FPGA apparatus and a method for protecting bitstreams are provided. The FPGA apparatus includes: a key storage unit, which is configured to be accessed only from within the FPGA, and having stored therein the encryption/decryption key and the initial key generated by the random number generator; a setting bitstream storage unit, which is an internal non-volatile memory stored with bitstreams for setting authentication and encryption/decryption; and an authentication and encryption/decryption setting unit, which is configured to call the encryption and decryption key and the initial value stored in the key storage unit to store encrypted bitstreams and authentication codes generated as a result of performing encryption on the bitstreams stored in the setting bitstream storage unit in external non-volatile memory, and verity the integrity of the encrypted bitstreams stored in the external non-volatile memory at the time of designing of the FPGA using the encrypted bitstreams.

14 Claims, 7 Drawing Sheets

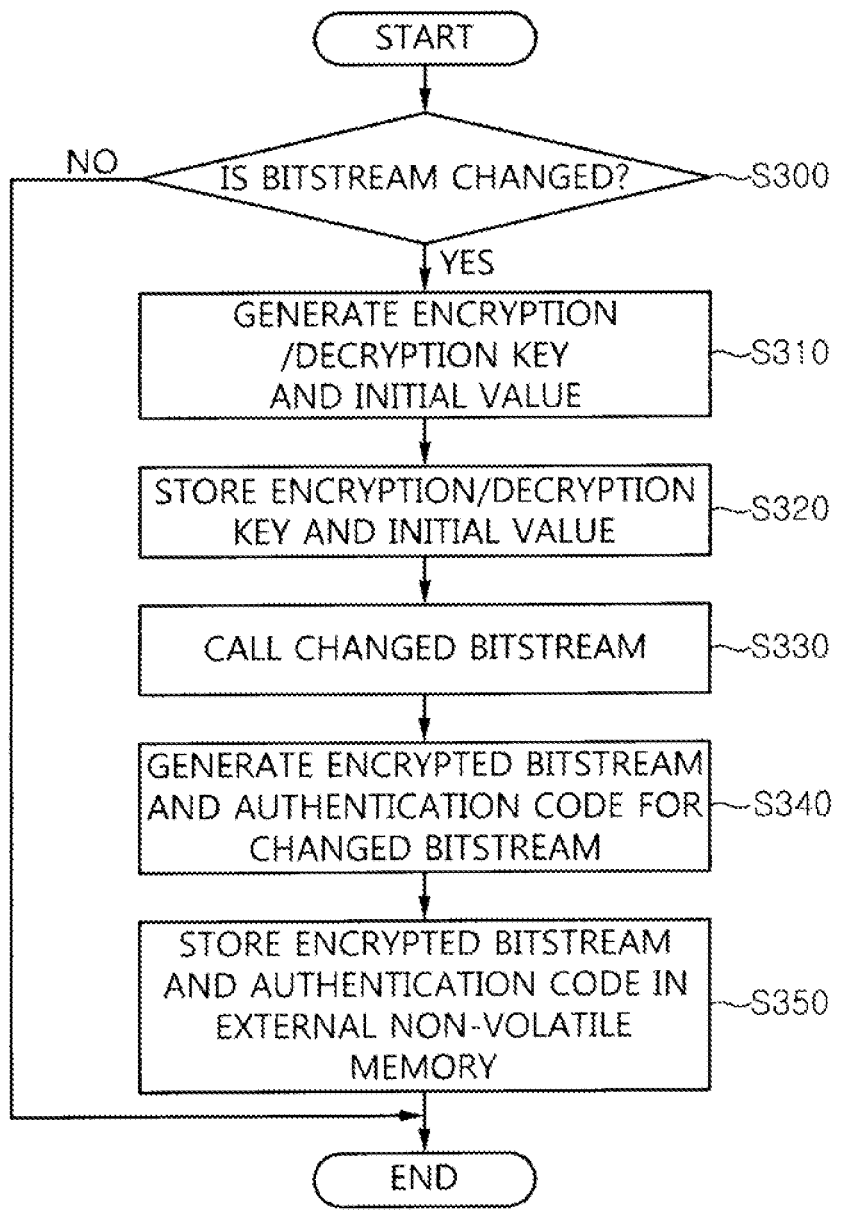

FPGA APPARATUS AND METHOD FOR PROTECTING BITSTREAM

CROSS-REFERENCE TO RELATED APPLICATION

This application claims priority to Korean Patent Application No. 10-2011-0134839 filed on Dec. 14, 2011, which is incorporated herein by reference in its entirety.

BACKGROUND OF THE INVENTION

1. Field of the Invention

Exemplary embodiments of the present invention relate to an FPGA apparatus and a method for protecting bitstreams, and particularly to an FPGA apparatus and a method for protecting bitstreams which are capable of preventing bitstreams from being illegally acquired and modulated through the inclusion of a device for authenticating and encrypting/decrypting bitstreams used to design a field programmable gate array (FPGA).

2. Description of Related Art

Generally, an FPGA has a slower speed than that of an application-specific integrated circuit (ASIC), but has advantages such as a short development period, rectification of errors onsite, low initial development cost, and the like. As a result, FPGAs have been used in various applications, and technology related thereto h as continuously developed. FPGAs are broadly classified into static random access memory (SRAM)-based products and flash memory-based products. Currently, SRAM-based products occupy most of the market.

The FPGA is programmed by loading bitstreams, which are data for setting the design in the FPGA, and the structure of the SRAM-based FPGA has a volatile nature, and thus the design set in the FPGA disappears when the supply of power is cut off. Therefore, current FPGA products are operated in a manner such that an electrically erasable programmable read-only memory (EEPROM) or non-volatile memory such as flash memory is installed outside the FPGA to store bitstream information, and the FPGA is automatically reprogrammed whenever power is supplied.

In order to prevent the bitstream information written in the external non-volatile memory from being illegally acquired, current SRAM based FPGA products use method for protecting bitstreams in which encrypted bitstreams are stored in non-volatile memory, and when power is supplied, the bitstreams are decrypted using a decryption logic circuit disposed in the FPGA, and the decrypted bitstreams are then transferred to a logic setting memory and used for programming.

The decryption logic circuit in the FPGA uses a circuit for processing a commercial standard block encryption algorithm, such as a data encryption standard (DES) or an advanced encryption standard (AES), which is implemented as a fixed circuit during a manufacturing process, unlike general programmable components in the FPGA and thus cannot be accessed or changed by a user.

Further, a key storage space for decryption has key information, which is required to decrypt the encrypted bitstreams, stored therein. When the storage information is exposed, the bitstreams can be acquired in plain text form. The storage information of the space can be written in peripheral devices (often PCs or notebooks) but cannot be read therefrom.

Meanwhile, the method for protecting bitstreams for current FPGA products using encryption/decryption as described above provides confidentiality, in that bitstream data are protected from illegal acquisition or copying, but does not guarantee the integrity of the encrypted bitstream data.

That is, when attackers arbitrarily modulate the encrypted bitstreams for the purpose of making the corresponding FPGA unable to provide service or the like, the decryption logic circuit in the FPGA decrypts the modulated bitstreams and transfers the decrypted bitstreams to the logic setting memory, whereby the FPGA may be programmed with an abnormally modulated design.

A case was recently announced in which decryption key information stored in a key storage space for decryption was successfully acquired by applying a power analysis attack, which is a sub-channel attack mechanism that is mainly targeted to smart cards, to SRAM-based FPGA products to acquire and analyze information about power consumption, which is generated while the decryption logic circuit in the FPGA is operated, which happens every time the FPGA is programmed.

Therefore, in order to protect a semiconductor design and secure the safety of a system, a need exists for a method or an apparatus for more securely protecting the FPGA bitstreams against currently known attack methods.

SUMMARY OF THE INVENTION

An embodiment of the present invention is directed to an FPGA apparatus and a method for protecting bitstreams which are capable of arbitrarily modulating bitstreams and securely protecting bitstreams from a sub-channel attack using information that is leaked at the time of operation of the FPGA by securing the confidentiality and integrity of bitstreams provided for current FPGA products.

Another embodiment of the present invention is directed to an FPGA apparatus and a method for protecting bitstreams achieving the above-mentioned object while minimizing changes to a conventional FPGA programming scheme for convenience of use.

Other objects and advantages of the present invention can be understood by the following description, and will become apparent with reference to the embodiments of the present invention. Also, it will be obvious to those skilled in the art to which the present invention pertains that the objects and advantages of the present invention can be realized by the means as claimed and combinations thereof.

In accordance with an embodiment of the present invention, an FPGA apparatus for protecting bitstreams includes: a random number generator, which is configured to be disposed in the FPGA and generate an encryption/decryption key and an initial value for encryption/decryption of bitstreams; a key storage unit, which is configured to be accessed only in the FPGA and stored with the encryption/decryption key and the initial key generated by the random number generator; a setting bitstream storage unit, which is internal non-volatile memory configured for storing bitstreams for setting authentication and encryption/decryption; and an authentication and encryption/decryption setting unit, which is configured to call the encryption and decryption key and the initial value stored in the key storage unit for storing encrypted bitstreams and authentication codes generated as a result of performing encryption on the bitstreams stored in the setting bitstream storage unit in an external non-volatile memory and verify the integrity of the encrypted bitstreams stored in the external non-volatile memory at the time of designing of the FPGA using the encrypted bitstreams.

The authentication and encryption/decryption setting unit may compare the authentication codes generated as a result of performing decryption on the encrypted bitstreams stored in the external non-volatile memory with the authentication codes stored in the external non-volatile memory to verify the integrity of the encrypted bitstreams.

The authentication and encryption/decryption setting unit may be used to change a preset authentication and encryption/decryption algorithm to an authentication and encryption/decryption algorithm input by a user.

The authentication and encryption/decryption setting unit may remove the authentication code and the encrypted bitstreams stored in the external non-volatile memory when the authentication codes generated as the result of performing decryption on the encrypted bitstreams do not coincide with the authentication codes recalled from the external non-volatile memory.

The FPGA apparatus may further include a logic storage unit for storing the decrypted bitstreams when the authentication codes generated as the result of performing decryption on the encrypted bitstreams coincide with the authentication codes recalled from the external non-volatile memory, wherein the decrypted bitstreams are used for setting a semiconductor design in the corresponding FPGA.

The setting bitstream storage unit may have changed bitstreams stored therein.

The authentication and encryption/decryption setting unit may re-perform encryption on the changed bitstreams using the encryption/decryption key and the initial value, and as a result, may re-generate the authentication codes and the encrypted bitstreams.

The authentication and encryption/decryption setting unit may change a preset authentication and encryption/decryption algorithm to an authentication and encryption/decryption algorithm input by a user.

The key storage unit may use one of a non-volatile memory region in the FPGA and a static random access memory (SRAM) region for battery backup.

The key storage unit may be set to be accessed only by the authentication and encryption/decryption setting unit.

In another embodiment of the present invention, a method for protecting bitstreams includes: storing an encryption/decryption key and an initial value generated by a random number generator disposed in an FPGA in a memory region that can be accessed only by the FPGA; recalling the stored encryption/decryption key and initial value to perform encryption on the bitstreams, and as a result, generating the authentication codes and the encrypted bitstreams; storing the authentication codes and the encrypted bitstreams in an external non-volatile memory; performing decryption on the encrypted bitstreams stored in the external non-volatile memory at the time of designing of the FPGA using the encrypted bitstreams; and verifying the integrity of the encrypted bitstreams by comparing the authentication codes generated as a result of performing decryption on the encrypted bitstreams stored in the external non-volatile memory with the authentication codes stored in the external non-volatile memory.

The method for protecting bitstreams may further include: receiving a new authentication and encryption/decryption algorithm from a user; and resetting an authentication and encryption/decryption algorithm preset in the FPGA by an authentication and encryption/decryption algorithm input by a user.

The method for protecting bitstreams may further include, when verifying the integrity, removing the authentication codes and the encrypted bitstreams stored in the external non-volatile memory when the authentication codes generated as a result of performing decryption on the encrypted bitstreams do not coincide with the authentication codes recalled from the external non-volatile memory.

The method for protecting bitstreams may further include, when verifying the integrity, storing the decrypted bitstreams when the authentication codes generated as a result of performing decryption on the encrypted bitstreams coincide with the authentication codes recalled from the external non-volatile memory, wherein the decrypted bitstreams are used for setting a semiconductor design in the corresponding FPGA.

The method for protecting bitstreams may further include storing the changed bitstreams in an internal non-volatile memory region.

The method for protecting bitstreams may further include: re-performing encryption on the changed bitstreams using the encryption/decryption key and the initial value, and as a result, re-generating the authentication codes and the encrypted bitstreams.

BRIEF DESCRIPTION OF THE DRAWINGS

FIGS. 6 to 8 are flow charts illustrating the operational flow of a method for protecting bitstreams in accordance with an embodiment of the present invention.

DESCRIPTION OF SPECIFIC EMBODIMENTS

Figure 1:
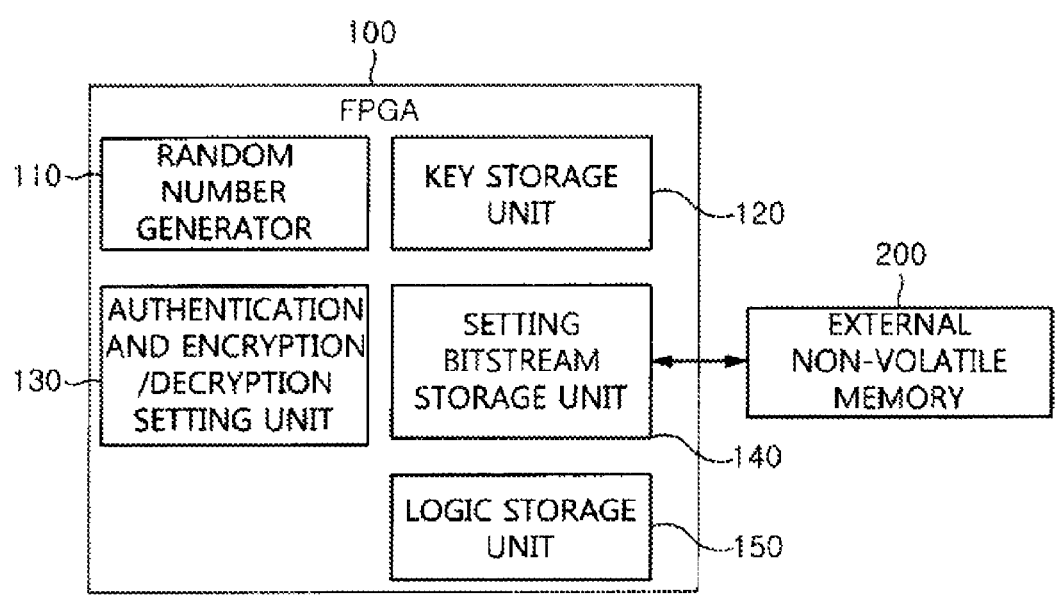
FIG. 1 is a block diagram for describing the configuration of an FPGA apparatus for protecting bitstreams in accordance with an embodiment of the present invention.

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale, and in some instances, proportions may have been exaggerated in order to clearly illustrate features of the embodiments. When a first layer is referred to as being "on" a second layer or "on" a substrate, it not only refers to the case where the first layer is formed directly on the second layer or the substrate but also the case where a third layer exists between the first layer and the second layer or the substrate.

A field programmable gate array (FPGA) applied to an embodiment of the present invention is a semiconductor device that includes programmable logic elements and programmable internal lines. Examples of the programmable logic elements include AND, OR, XOR, NOT and the like, and may duplicate and program the functions of basic logic gates, such as a combination of more complicated decoders or calculation functions, or the like. The FPGA includes simple flip flops or memory elements configured of a memory block in addition to the programmable logic elements.

In the FPGA, when the bitstreams programmed by a system designer are stored in an internal memory block, a semiconductor is designed by connecting the logic elements with the internal lines of the FPGA based on the stored bitstreams.

The FPGA apparatus for protecting bitstreams in accordance with the embodiment of the present invention secures the confidentiality and integrity of bitstreams for designing the semiconductor of the FPGA, and securely protects the bitstreams from a sub-channel attack using information that is leaked at the time of the operation of the FPGA.

Hereinafter, embodiments of the present invention will be described in detail with reference to the accompanying drawings.

FIG. 1 is a block diagram for describing the configuration of an FPGA apparatus for protecting bitstreams in accordance with an embodiment of the present invention.

As illustrated in FIG. 1, an FPGA apparatus for protecting bitstreams in accordance with an embodiment of the present invention includes a random number generator 110, a key storage unit 120, an authentication and encryption/decryption setting unit 130, a setting bitstream storage unit 140, and a logic storage unit 150.

The random number generator 110 is disposed in an FPGA 100 to generate an encryption/decryption key and an initial value for encryption/decryption of bitstreams. In this case, the random number generator 110 may generate a new encryption/decryption key and initial value for encryption/decryption whenever a new bitstream is input. In some cases, when a bitstream corrected for the encrypted bitstream is input, the random number generator 110 may generate a new encryption/decryption key and initial value.

The key storage unit 120 can be accessed only in the FPGA 100, and the encryption/decryption key and the initial key generated by the random number generator 110 are stored therein. Therefore, the key storage unit 120 cannot be accessed from outside, and the encryption/decryption key and the initial value stored in the key storage unit 120 cannot be read.

In this case, the key storage unit 120 is not implemented as a separate storage unit, and an internal non-volatile memory region, a static random access memory (SRAM) region of the conventional FPGA 100 for battery backup, or the like, may be used. However, the key storage unit 120 is set such that it can be accessed only by the authentication and encryption/decryption setting unit 130.

The setting bitstream storage unit 140, which is the internal non-volatile memory of the FPGA 100, is stored with bitstreams for setting authentication and encryption/decryption. In this case, the internal non-volatile memory of the FPGA 100 is a memory region which can be written to from outside, but cannot be read from outside.

The authentication and encryption/decryption setting unit 130 uses the encryption/decryption key and the initial value stored in the key storage unit 120 to perform encryption on the bitstreams stored in the setting bitstream storage unit 140. The authentication and encryption/decryption setting unit 130 generates authentication codes and encrypted bitstreams as a result of performing encryption on the bitstreams.

The authentication and encryption/decryption setting unit 130 stores the authentication codes and the encrypted bitstreams in external non-volatile memory 200.

Meanwhile, when the bitstreams encrypted by the user are changed, the corrected bitstreams are stored in the setting bitstream storage unit 140.

In this case, when the changed bitstreams are stored in the setting bitstream storage unit 140, the authentication and encryption/decryption setting unit 130 performs encryption on the bitstreams changed using the encryption/decryption key and the initial value stored in the key storage unit 120 or the encryption/decryption key and an initial value newly generated by the random number generator 110. In this case, the authentication and encryption/decryption setting unit 130 re-generates the authentication codes and the encrypted bitstreams as a result of performing encryption on the changed bitstreams.

Similarly, the re-generated authentication codes and encrypted bitstreams are stored in the external non-volatile memory 200.

Meanwhile, the authentication and encryption/decryption setting unit 130 recalls the authentication codes and the encrypted bitstreams stored in the external non-volatile memory 200 for setting the design in the FPGA 100 and performs decryption on the encrypted bitstreams using the encryption and decryption key, or the like, stored in the key storage unit 120. In this case, the authentication and encryption/decryption setting unit 130 compares the authentication codes generated as the result of performing decryption on the encrypted bitstreams with the authentication codes recalled from the external non-volatile memory 200 to verify the authentication codes stored in the external non-volatile memory 200.

When the verification of the corresponding authentication codes succeeds, that is, when the authentication codes generated as the result of performing decryption coincide with the authentication codes recalled from the external non-volatile memory 200, the authentication and encryption/decryption setting unit 130 stores the decrypted bitstreams in the logic storage unit 150.

In this case, the decrypted bitstreams stored in the logic storage unit 150 are finally used to design the semiconductor of the corresponding FPGA 100.

Meanwhile, when the verification of the corresponding authentication codes fails, that is, when the authentication codes generated as the result of performing decryption do not coincide with the authentication codes recalled from the external non-volatile memory 200, the authentication and encryption/decryption setting unit 130 determines that the authentication codes and the encrypted bitstreams stored in the external non-volatile memory 200 have been modulated from outside, and removes the corresponding authentication codes and encrypted bitstreams.

In this case, the authentication and encryption/decryption setting unit 130 applied to the embodiment of the present invention changes a preset authentication and encryption/decryption algorithm to an authentication and encryption/decryption algorithm input from a user.

Therefore, the authentication and encryption/decryption setting unit 130 applies the reset authentication and encryption/decryption algorithm according to a request of a user to perform the authentication and encryption/decryption on the bitstreams of the FPGA.

Figure 2:
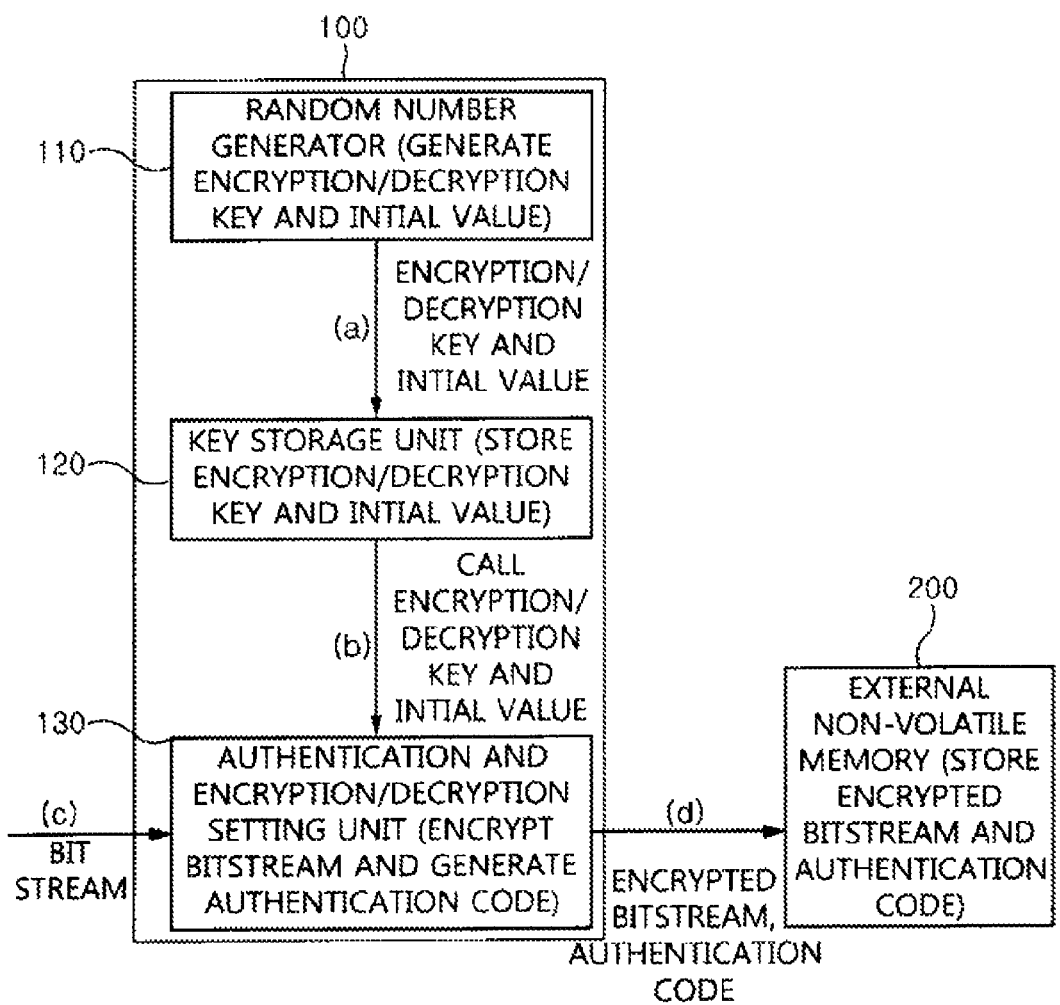
FIG. 2 is an exemplary diagram for describing the operation of an FPGA apparatus for protecting bitstreams in accordance with a first embodiment of the present invention.

FIG. 2 is an exemplary diagram for describing the operation of the FPGA apparatus for protecting bitstreams in accordance with a first embodiment of the present invention.

As illustrated in FIG. 2, the random number generator 110 generates the encryption/decryption key and the initial value for encryption and decryption of bitstreams in the FPGA 100. In this case, the generated encryption/decryption key and the initial value are stored in the key storage unit 120 as in (a).

The authentication and encryption/decryption setting unit 130 accesses the key storage unit 120 as in (c) to call the encryption/decryption key and the initial value when the bitstreams are input as in (b), and encrypts the bitstreams using the recalled encryption/decryption key and the initial value.

The embodiment of FIG. 2 illustrates that the bitstream is input from the outside for process (b), but may recall the bitstream stored in the setting bitstream storage unit 140 in the FPGA to perform encryption.

In this case, the authentication and encryption/decryption setting unit 130 stores the encrypted bitstreams and the authentication codes, generated as the result of encryption, in the external non-volatile memory 200 as in (d).

Figure 3:
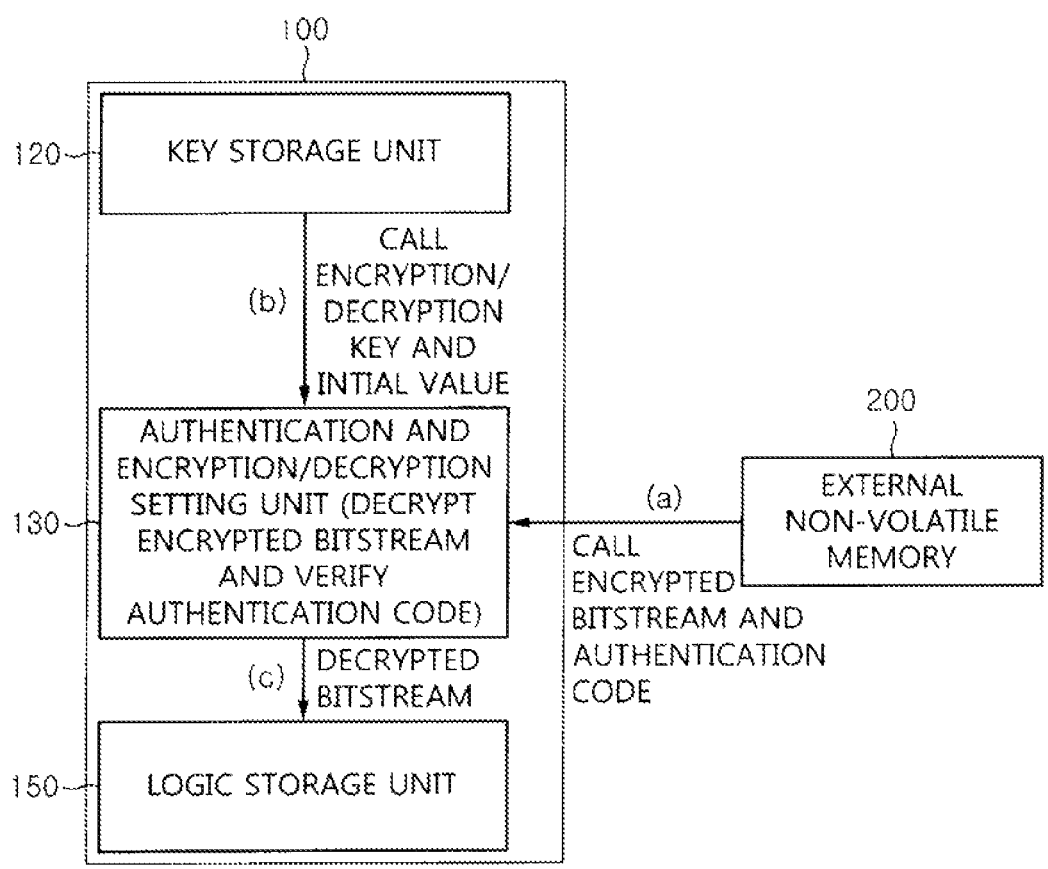
FIG. 3 is an exemplary diagram for describing the operation of an FPGA apparatus for protecting bitstreams in accordance with a second embodiment of the present invention.

FIG. 3 is an exemplary diagram for describing the operation of the FPGA apparatus for protecting bitstreams in accordance with a second embodiment of the present invention. In particular, there is illustrated an example in which the verification of the encrypted bitstreams and the authentication codes stored in the external non-volatile memory 200 succeeds.

As illustrated in FIG. 3, the authentication and encryption/decryption setting unit 130 recalls the encrypted bitstream and the authentication codes stored in the external non-volatile memory 200 as in (a) for setting the design in the FPGA 100.

In addition, the authentication and encryption and decryption setting unit 130 recalls the encryption/decryption key and the initial value stored in the key storage unit 120 as in (b) for decrypting the encrypted bitstreams recalled for process (a) and performs the decryption on the encrypted bitstreams using the recalled encryption/decryption key and the initial value. In this case, the authentication and encryption/decryption setting unit 130 verifies the integrity of the authentication codes stored in the external non-volatile memory 200.

As an example, the authentication and encryption/decryption setting unit 130 compares the authentication codes generated as the result of performing decryption on the encrypted bitstreams with the authentication codes recalled from the external non-volatile memory 200 to verify the authentication codes stored in the external non-volatile memory 200.

When the verification of the corresponding authentication codes succeeds, that is, when the authentication codes generated as the result of performing decryption coincide with the authentication codes recalled from the external non-volatile memory 200, the authentication and encryption/decryption setting unit 130 determines that the authentication codes and the encrypted bitstreams stored in the external non-volatile memory 200 have not been modulated from outside, and stores the decrypted bitstreams in the logic storage unit 150 as in (c).

Therefore, the FPGA 100 finally applies the decrypted bitstreams stored in the logic storage unit 150 to set the semiconductor design in the corresponding FPGA 100.

Figure 4:
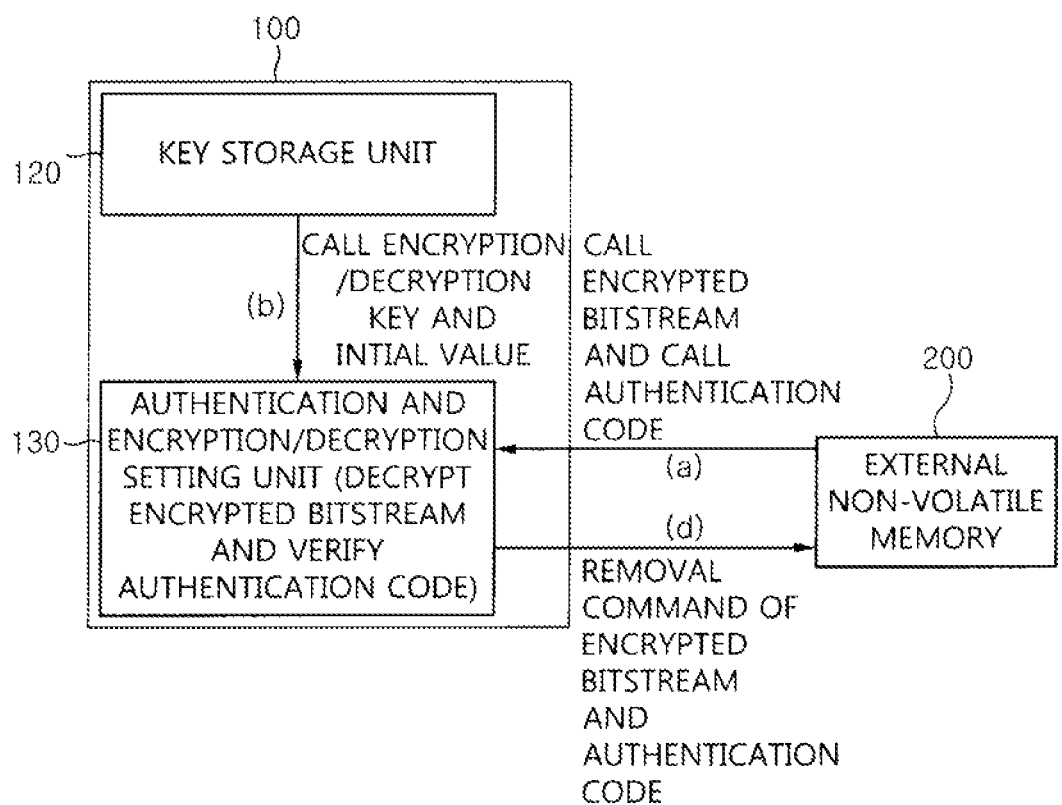
FIG. 4 is an exemplary diagram for describing the operation of an FPGA apparatus for protecting bitstreams in accordance with a third embodiment of the present invention.

FIG. 4 is an exemplary diagram for describing the operation of the FPGA apparatus for protecting bitstreams in accordance with a third embodiment of the present invention. In particular, there is illustrated an example in which the verification of the encrypted bitstreams and the authentication codes stored in the external non-volatile memory 200 fails.

As illustrated in FIG. 4, the authentication and encryption/decryption setting unit 130 recalls the encrypted bitstream and the authentication codes stored in the external non-volatile memory 200 as in (a) for setting the design in the FPGA 100.

In addition, the authentication and encryption and decryption setting unit 130 recalls the encryption/decryption key and the initial value stored in the key storage unit 120 as in (b) for decrypting the encrypted bitstreams recalled for the process (a) and performs decryption on the encrypted bitstreams using the recalled encryption/decryption key and the initial value. In this case, the authentication and encryption/decryption setting unit 130 verifies the integrity of the authentication codes stored in the external non-volatile memory 200.

As an example, the authentication and encryption/decryption setting unit 130 compares the authentication codes generated as the result of performing decryption on the encrypted bitstreams with the authentication codes recalled from the external non-volatile memory 200 to verify the authentication codes stored in the external non-volatile memory 200.

In this case, when the verification of the corresponding authentication codes fails, that is, when the authentication codes generated as the result of performing decryption do not coincide with the authentication codes recalled from the external non-volatile memory 200, the authentication and encryption/decryption setting unit 130 determines that the authentication codes and the encrypted bitstreams stored in the external non-volatile memory 200 have been modulated from outside, and outputs a control command for removing the corresponding authentication codes and the encrypted bitstreams as in (d) to the external non-volatile memory 200.

Therefore, the encrypted bitstreams and the authentication codes stored in the external non-volatile memory 200 are removed, thus making it possible to prevent the modulated bitstreams from being used to design the semiconductor of the FPGA 100.

Figure 5:
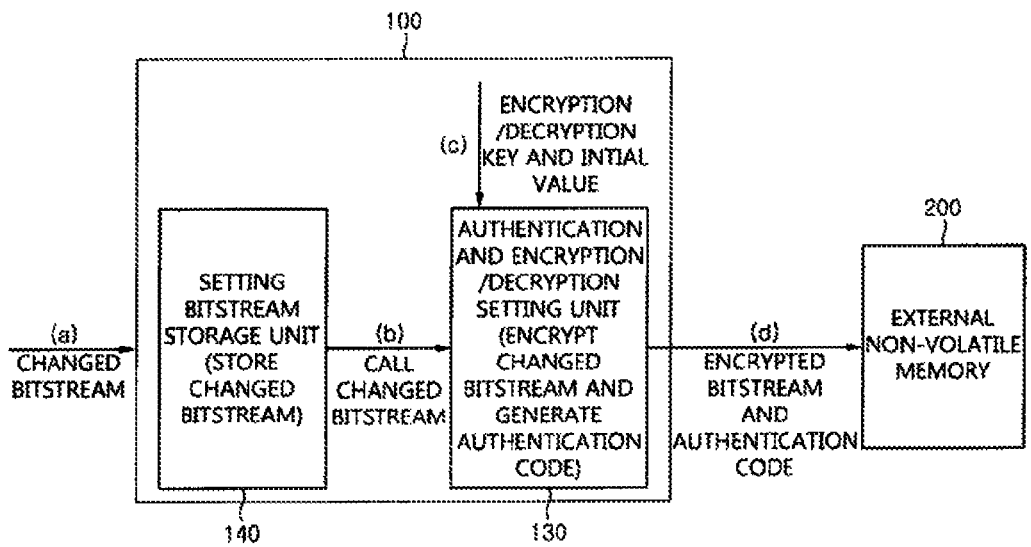
FIG. 5 is an exemplary diagram for describing the operation of an FPGA apparatus for protecting bitstreams in accordance with a fourth embodiment of the present invention.

FIG. 5 is an exemplary diagram for describing the operation of an FPGA apparatus for protecting bitstreams in accordance with a fourth embodiment of the present invention. In particular, there is illustrated an example in which the changed bitstreams are applied to the conventional encrypted bitstreams.

As illustrated in FIG. 5, when the bitstreams encrypted by the user, that is, the system designer, are changed, the changed bitstreams are stored in the setting bitstream storage unit 140 as in (a).

In this case, when the changed bitstreams are stored in the setting bitstream storage unit 140, the authentication and encryption/decryption setting unit 130 recalls the changed bitstreams stored in the setting bitstream storage unit 140 as in (b) and performs encryption on the changed bitstreams by recalling the encryption/decryption key and the initial value as in (c).

In this case, the authentication and encryption/decryption setting unit 130 stores the encrypted bitstreams and the authentication codes generated as the result of performing encryption on the changed bitstreams in the external non-volatile memory 200 as in (d).

Therefore, the encrypted bitstreams and the authentication codes for the changed bitstreams are stored in the external non-volatile memory 200.

Thereafter, the authentication and encryption/decryption setting unit 130 recalls the encrypted bitstreams and the authentication codes stored in the external non-volatile memory 200 to thus design the semiconductor of the FPGA 100.

Figure 6:
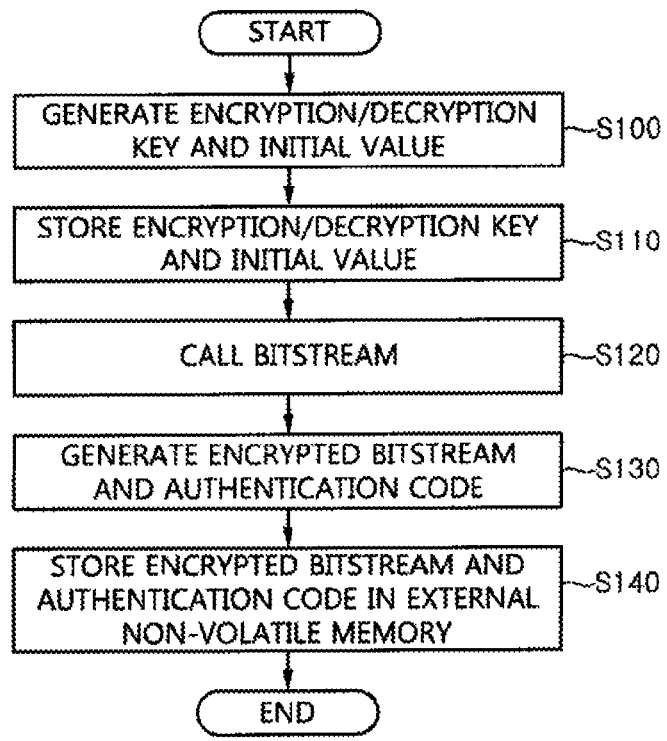
Figure 7:
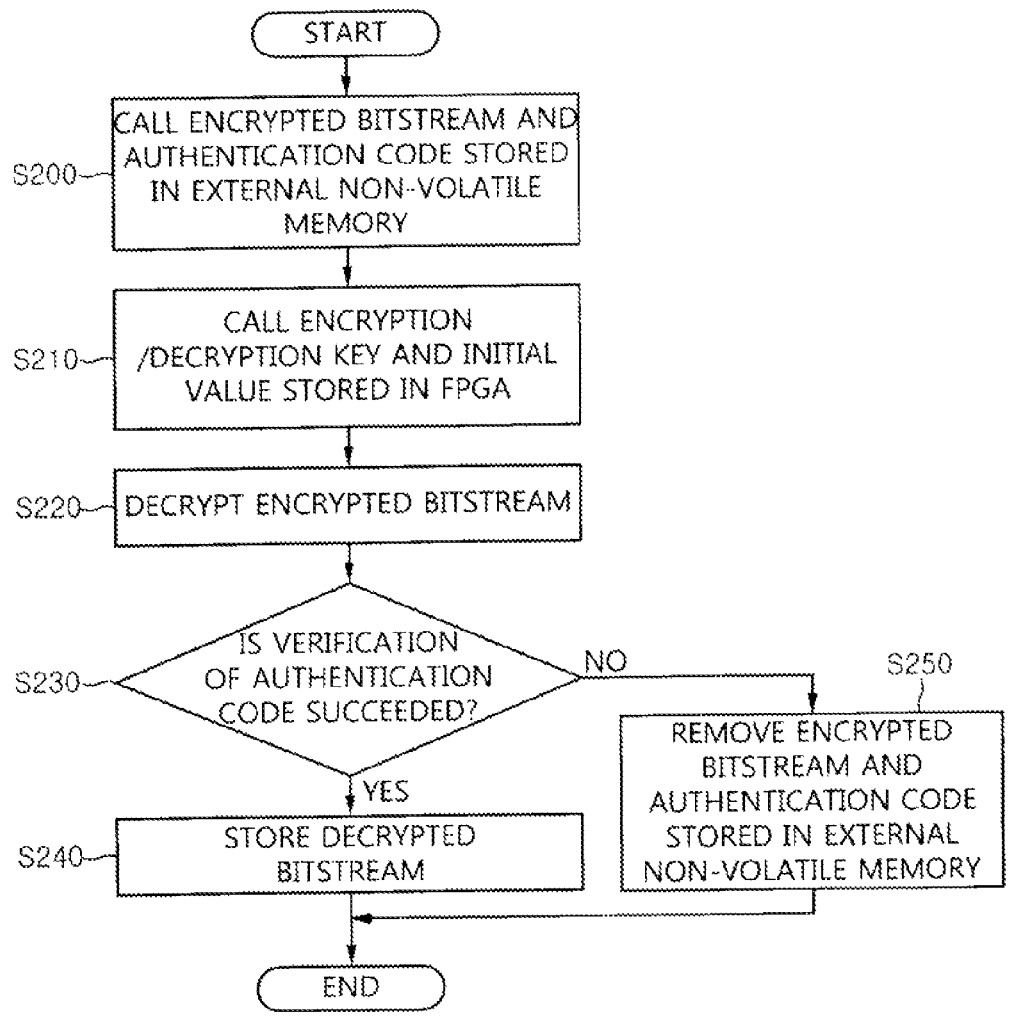

FIGS. 6 to 8 are flow charts illustrating the operational flow of a method for protecting bitstreams in accordance with the embodiment of the present invention.

First, FIG. 6 is a flow chart for describing the operation of encrypting bitstreams of the FPAG.

As illustrated in FIG. 6, the FPGA apparatus for protecting bitstreams in accordance with the embodiment of the present invention stores the encryption/decryption key (S110) and the initial value generated for process 'S100' in the memory region accessible only from within the FPGA when the encryption/decryption key and the initial value are generated by the random number generator in the FPGA (S100).

Meanwhile, the FPGA apparatus for protecting bitstreams recalls the stored bitstreams when the setting bitstreams for authentication and encryption/decryption are stored in the internal non-volatile memory region (S120).

Thereafter, the FPGA apparatus for protecting bitstreams uses the encryption/decryption key and the initial value generated for the process 'S100' to encrypt the bitstreams recalled for process 'S120', and as a result, generates the encrypted bitstreams and the authentication codes (S130).

The encrypted bitstreams and the authentication codes generated for process 'S130' are stored in the external non-volatile memory (S140).

FIG. 7 is a flow chart for describing the operation of decrypting bitstreams of the FPAG.

As illustrated in FIG. 7, the FPGA apparatus for protecting bitstreams in accordance with the embodiment of the present invention recalls the encrypted bitstreams and the authentication codes stored in the external non-volatile memory for setting the semiconductor design (S200).

In addition, the FPGA apparatus for protecting bitstreams recalls the encryption/decryption key and the initial value stored in the memory region accessible only in the FPAG for decryption the encrypted bitstreams recalled for process 'S200' (S210) and performs decryption on the encrypted bitstreams using the encryption/decryption key and the initial value recalled for process 'S210' (S220). In this case, the FPGA apparatus for protecting bitstreams verifies the integrity of the authentication codes stored in the external non-volatile memory.

In this case, the FPGA apparatus for protecting bitstreams compares the authentication codes generated as the result of performing decryption on the encrypted bitstreams with the authentication codes recalled from the external non-volatile memory to thus verify the authentication codes stored in the external non-volatile memory.

The FPGA apparatus for protecting bitstreams determines that the authentication codes and the encrypted bitstreams stored in the external non-volatile memory have not been modulated from outside when the verification of the corresponding authentication codes succeeds (S230), that is, when the authentication codes generated as the result of performing decryption correspond to the authentication codes recalled from the external non-volatile memory, and stores the decrypted bitstreams in the logic setting memory region for setting the design in the FPGA (S240).

Therefore, the FPGA finally applies the decrypted bitstreams stored in the logic storage unit 150 to set the semiconductor design in the corresponding FPGA.

Conversely, the FPGA apparatus for protecting bitstreams determines that the authentication codes and the encrypted bitstreams stored in the external non-volatile memory have been modulated from outside when the verification of the corresponding authentication codes fails (S230), that is, when the authentication codes generated as the result of performing decryption do not coincide with the authentication codes recalled from the external non-volatile memory, and removes the encrypted bitstreams and the authentication codes stored in the external non-volatile memory (S250).

Thereby, it is possible to prevent the modulated bitstreams from being used for setting the semiconductor design in the FPGA.

FIG. 8 is a flow chart for describing an operation of encrypting the changed bitstreams of the FPAG.

As illustrated in FIG. 8, when the previously stored bitstreams are changed (S300), the random number generator in the FPGA apparatus for protecting bitstreams in accordance with the embodiment of the present invention generates the encryption/decryption key and the initial value (S310). The encryption/decryption key and the initial value generated for process 'S310' are stored only in the memory region accessible only from within the FPGA.

Meanwhile, the FPGA apparatus for protecting bitstreams recalls the changed bitstreams stored in the internal non-volatile memory region (S330), and uses the encryption/decryption key and the initial value generated for process 'S310' to encrypt the changed bitstreams recalled for process 'S330', and as a result, generates the encrypted bitstreams and the authentication codes (S340).

The encrypted bitstreams and the authentication codes generated for process 'S340' are stored in the external non-volatile memory (S350).

Therefore, even though the bitstreams are changed, it is possible to apply the changed bitstreams to the FPGA by again performing encryption on the changed bitstreams.

As described above, the FPGA apparatus and the method for protecting bitstreams in accordance with the embodiment of the present invention are described with reference to the accompanying drawings, but the present invention is not limited to the embodiments and the drawings disclosed in the specification, and may be modified without departing from the scope of the present invention.

The embodiments of the present invention can use a random value generated by a random number generator in the FPGA as the key information and initial value used for the authentication-encryption/decryption operation and prevent the random value from being exposed to the outside of the FPGA, thereby securing the confidentiality for the FPGA bitstreams and securing the integrity thereof.

In addition, the embodiments of the present invention can safely protect the bitstreams from sub-channel attacks that use information that is leaked at the time of the operation of the FPGA, and can be changed and reset according to user demand, thereby securely protecting the bitstreams from the sub-channel attack.

In addition, the embodiments of the present invention can safely protect the bitstreams while maintaining the conventional FPGA programming scheme unchanged, without changing the components of peripheral devices, such as a PC or the like.

While the present invention has been described with respect to specific embodiments, it will be apparent to those skilled in the art that various changes and modifications may be made without departing from the spirit and scope of the invention as defined in the following claims.

What is claimed is:

1. An FPGA (field programmable gate array) apparatus for protecting bitstreams, comprising:
   a random number generator configured to be disposed in the FPGA apparatus and generate an encryption/decryption key and an initial value for encryption/decryption of a bitstreams;
   a key storage unit configured to be accessed only from within the FPGA apparatus, and store the encryption/decryption key and the initial key;
   a setting bitstream storage unit configured to store bitstreams for setting authentication and encryption/decryption, the setting bitstream storage being an internal non-volatile memory; and
   an authentication and encryption/decryption setting unit configured to call the encryption and decryption key and the initial value stored in the key storage unit to store encrypted bitstreams and authentication codes generated as a result of performing encryption on the bitstreams stored in the setting bitstream storage unit in an external non-volatile memory and verify integrity of the encrypted bitstreams stored in the external non-volatile memory at a time of designing of the FPGA apparatus using the encrypted bitstreams, wherein the authentication and encryption/decryption setting unit compares a first authentication codes generated as a result of performing decryption on the encrypted bitstreams stored in the external non-volatile memory with a second authentication codes stored in the external non-volatile memory to verify the integrity of the encrypted bitstreams.

2. The FPGA apparatus of claim 1, wherein the authentication and encryption/decryption setting unit removes the second authentication code and the encrypted bitstreams stored in the external non-volatile memory when the first authentication codes do not correspond to the second authentication codes.

3. The FPGA apparatus of claim 1, further comprising a logic storage unit storing the decrypted bitstreams when the first authentication codes coincide with the second authentication codes,
wherein the decrypted bitstreams are used for setting a semiconductor design in the corresponding FPGA.

4. The FPGA apparatus of claim 1, wherein the setting bitstream storage unit stores changed bitstreams.

5. The FPGA apparatus of claim 4, wherein the authentication and encryption/decryption setting unit performs encryption on the changed bitstreams using the encryption/decryption key and the initial value again, and as a result, re-generates the authentication codes and the encrypted bitstreams.

6. The FPGA apparatus of claim 1, wherein the authentication and encryption/decryption setting unit resets a preset authentication and encryption/decryption algorithm to an authentication and encryption/decryption algorithm input from a user.

7. The FPGA apparatus of claim 1, wherein the key storage unit uses one of a non-volatile memory region in the FPGA apparatus and a static random access memory (SRAM) region for battery backup.

8. The FPGA apparatus of claim 1, wherein the key storage unit is set to be accessed only by the authentication and encryption/decryption setting unit.

9. A method for protecting bitstreams, comprising:
storing an encryption/decryption key and an initial value generated by a random number generator in an FPGA, in a memory region, the memory region accessed only from within the FPGA;
calling the encryption/decryption key and the initial value, stored at the storing the encryption/decryption key and the initial value, to perform encryption on the bitstreams, and as a result, generating authentication codes and encrypted bitstreams;
storing the authentication codes and the encrypted bitstreams in an external non-volatile memory;
performing decryption on the encrypted bitstreams stored in the external non-volatile memory at a time of designing of the FPGA using the encrypted bitstreams; and
verifying integrity of the encrypted bitstreams by comparing a first authentication codes generated as a result of performing decryption on the encrypted bitstreams stored in the external non-volatile memory with a second authentication codes stored in the external non-volatile memory.

10. The method of claim 9, further comprising:
receiving a new authentication and encryption/decryption algorithm from a user; and
resetting an authentication and encryption/decryption algorithm preset in the FPGA to an authentication and encryption/decryption algorithm input from a user.

11. The method of claim 9, wherein the verifying the integrity of the encrypted bitstreams, removes the second authentication codes and the encrypted bitstreams stored in the external non-volatile memory when the first authentication codes do not coincide with the second authentication codes.

12. The method of claim 9, wherein the verifying the integrity of the encrypted bitstreams, stores the decrypted bitstreams when the first authentication codes coincide with the second authentication codes, and
the decrypted bitstreams are used for setting a semiconductor design in the corresponding FPGA.

13. The method of claim 9, further comprising storing the changed bitstreams in an internal non-volatile memory region.

14. The method of claim 13, further comprising performing encryption on the changed bitstreams using the encryption/decryption key and the initial value again, and as a result, re-generating the authentication codes and the encrypted bitstreams.

* * * * *